United States Patent
Yu et al.

(10) Patent No.: US 11,090,140 B2
(45) Date of Patent: Aug. 17, 2021

(54) CAVITY PREPARATION ASSEMBLY AND GUIDING SLEEVE FOR IMMEDIATE IMPLANTATION IN ORAL MOLAR REGION

(71) Applicant: Sichuan University, Sichuan (CN)

(72) Inventors: Haiyang Yu, Sichuan (CN); Xi Chen, Sichuan (CN); Yuwei Zhao, Sichuan (CN)

(73) Assignee: SICHUAN UNIVERSITY, Chengdu (CN)

( * ) Notice: Subject to any disclaimer, the term of this patent is extended or adjusted under 35 U.S.C. 154(b) by 186 days.

(21) Appl. No.: 16/328,027

(22) PCT Filed: Mar. 30, 2018

(86) PCT No.: PCT/CN2018/081248
§ 371 (c)(1),
(2) Date: Feb. 25, 2019

(87) PCT Pub. No.: WO2019/104921
PCT Pub. Date: Jun. 6, 2019

(65) Prior Publication Data
US 2021/0045850 A1    Feb. 18, 2021

(30) Foreign Application Priority Data
Nov. 29, 2017  (CN) .......................... 201711228871.9

(51) Int. Cl.
*A61C 8/00* (2006.01)
*A61C 19/04* (2006.01)
*A61C 1/08* (2006.01)

(52) U.S. Cl.
CPC ............ *A61C 8/0089* (2013.01); *A61C 1/082* (2013.01); *A61C 19/043* (2013.01)

(58) Field of Classification Search
CPC ....... A61C 8/001; A61C 8/0089; A61C 8/009; A61C 1/082; A61C 1/084; A61C 1/085;
(Continued)

(56) References Cited

U.S. PATENT DOCUMENTS 5,133,660 A * 7/1992 Fenick ..................... A61B 6/14
433/173
5,833,693 A * 11/1998 Abrahami ............ A61B 17/176
606/96

(Continued)

FOREIGN PATENT DOCUMENTS

CN      1901848      1/2007
CN      2865601      2/2007
(Continued)

OTHER PUBLICATIONS

Steco System Technik GMBH & Co. KG, DE 20 2013 101017U1, "Dental Drill Guiding Device for Guiding Drilling Tool in Positioning Sleeve for Implant Treatment", Mar. 18, 2013, Translated by JPO and INPIT, (Jan. 2021) (Year: 2021).*
International search report dated Aug. 20, 2018 from corresponding application No. PCT/CN2018/081248.

*Primary Examiner* — Jacqueline T Johanas
*Assistant Examiner* — Sharon E Kennedy
(74) *Attorney, Agent, or Firm* — Hauptman Ham, LLP

(57) ABSTRACT

The present invention discloses a cavity preparation assembly and a guiding sleeve for immediate implantation in an oral molar region, wherein the guiding sleeve comprises a lower sleeve and an upper sleeve disposed on a top of the lower sleeve, center portions of the upper sleeve and the lower sleeve each has a guiding hole and the guiding holes of the upper sleeve and the lower sleeve are connected, and an axis direction of the guiding hole is a vertical direction; sidewalls of the upper sleeve and the lower sleeve are each provided with a slit passing through the sidewalls, and the (Continued)

slit of the upper sleeve and the slit of the lower sleeve are located on a same side of the cavity preparation guiding sleeve; the upper sleeve is further provided with an installation plate on both sides of the slit, the installation plate is connected to the sidewalls on both sides of the slit of the upper sleeve. The cavity preparation assembly comprises a depth calibration drilling tool and a plurality of guiding sleeves. The present invention not only facilitates observation of the position of the drilling tool, prevent the drilling tool from sliding, but also provides the cooling water channels to cool the drilling tool, avoiding osteonecrosis. The depth calibration drilling tool performs precise cavity preparation according to the preparation depth.

20 Claims, 4 Drawing Sheets

(58) Field of Classification Search
CPC ....... A61C 5/44; A61C 19/041; A61C 19/043; A61C 19/055; A61B 17/17; A61B 17/176; A61B 17/171; A61B 17/1717; A61B 17/1728; A61B 17/1742
USPC ............................ 433/75, 76, 72, 74; 606/80
See application file for complete search history.

(56) References Cited

U.S. PATENT DOCUMENTS

| | | | |
|---|---|---|---|
| 8,585,402 B2* | 11/2013 | Vogel | A61C 1/084 433/72 |
| 8,801,725 B2* | 8/2014 | Ritter | A61B 17/17 606/102 |
| 2002/0028422 A1* | 3/2002 | Kumar | A61C 8/0089 433/165 |
| 2008/0220930 A1* | 9/2008 | Ramsay | H02K 41/031 476/4 |
| 2010/0136500 A1* | 6/2010 | Suter | A61C 1/084 433/75 |
| 2013/0023888 A1* | 1/2013 | Choi | A61C 1/084 606/96 |
| 2014/0093838 A1* | 4/2014 | Carmichael | A61C 8/0024 433/76 |
| 2014/0276879 A1* | 9/2014 | Lin | A61B 17/17 606/96 |
| 2021/0000568 A1* | 1/2021 | Renne | B29C 64/10 |

FOREIGN PATENT DOCUMENTS

| | | |
|---|---|---|
| CN | 202283287 | 6/2012 |
| CN | 202288506 | 7/2012 |
| DE | 202013101017 | 3/2013 |

* cited by examiner

CAVITY PREPARATION ASSEMBLY AND GUIDING SLEEVE FOR IMMEDIATE IMPLANTATION IN ORAL MOLAR REGION

RELATED APPLICATIONS

The present application is a National Phase of International Application Number PCT/CN2018/081248, filed Mar. 30, 2018, and claims the priority of China Application No. 201711228871.9, filed Nov. 29, 2017.

FIELD OF THE INVENTION

The present invention relates to the technical field of medical apparatus, and more particularly to a cavity preparation guiding sleeve and a cavity preparation assembly for immediate implantation in an oral molar region.

BACKGROUND OF THE INVENTION

An immediate dental implant refers to an implant implanted simultaneously after tooth extraction. That is to say that the implant is implanted immediately in the fresh tooth extraction wound. A large number of experiments and clinical studies confirming that immediate implantation and delayed implantation can both achieve the successful osseointegration. Since the immediate implantation does not need to wait until the healing of the extraction socket, shortening the course of treatment, and lowering the cost, and facilitates to maintaining gingival shape, reducing the absorption (atrophy) of the alveolar bone, and avoiding the shortage of bone in the planting area caused by the tooth extraction. Whether the immediate implantation can be carried out depends on the patient's condition, a single rooted tooth, a tooth root having no inflammation in the apical area are generally the most suitable for the immediate implantation.

For the immediate implantation of the missing tooth in the molar region, the location of an ideal implantation cavity thereof (the implantation site of the single tooth missing in the molar region) should be the center of the missing tooth, and an axial direction of which should be in the long axis of the tooth. When the immediate implantation is performed in the molar region, the extraction socket and the irregular bone septum of the root sample in the fresh tooth extraction wound always interfere with the preparation of the implantation cavity, the drilling tool sliding in a direction with a lower resistance (the extraction socket of the mesial root or distal root). The slide of the drilling tool may cause the implantation cavity to deviate from the ideal position, thereby affecting the initial stability of the implant. For the restoration oriented implant therapy, if the implantation site is deflected, it may cause the overhang and triangular space of the implant tooth crown during later restoration, and poor transmission of the bite force may further affect the health around and the longevity of the implant.

BRIEF SUMMARY OF THE INVENTION

The present invention aims to provide a cavity preparation guiding sleeve for immediate implantation in an oral molar region, solving the existing problem that the slide of the drilling tool may cause the implantation cavity to deviate from the ideal position.

The present invention is realized by following technical solutions:

A cavity preparation guiding sleeve for immediate implantation in an oral molar region, comprises a lower sleeve and an upper sleeve disposed on a top of the lower sleeve, center portions of the upper sleeve and the lower sleeve each has a guiding hole and the guiding holes of the upper sleeve and the lower sleeve are connected, an axis direction of the guiding hole is a vertical direction; sidewalls of the upper sleeve and the lower sleeve are each provided with a slit passing through the sidewalls, and the slit of the upper sleeve and the slit of the lower sleeve are located on a same side of the cavity preparation guiding sleeve; the upper sleeve is further provided with an installation plate on both sides of the slit, the installation plate is connected to the sidewalls on both sides of the slit of the upper sleeve. In the cavity preparation process of the immediate implantation in the oral molar region, the preparation of a central channel is first performed, and then a buccal/lingual side channel of the tooth crown is prepared, the buccal/lingual side channel connected with the central channel. After the channels are prepared, the guiding sleeve in the present technical solution is able to be placed in the central channel for cavity preparation guide, wherein, the lower sleeve extends into the central channel, and the installation plate can be placed in the buccal/lingual side channel, and since the installation plate is defined in the buccal/lingual side channel, the guiding sleeve may not rotate, preventing the drilling tool from sliding, thereby avoiding the implantation cavity to deviate from the ideal position, which ensures stability. In addition, the clearance between the two installation plates as well as the slits of the upper sleeve and the lower sleeve can further serve as the cooling water channels, which not only facilitates the observation of the position of the drilling tool, prevent the drilling tool from sliding, but more importantly provides the cooling water channels, by which, water can be easily introduced to the tip of the drilling tool, cooling the drilling tool.

As a further improvement of the present invention, the aforementioned cavity preparation guiding sleeve for the immediate implantation in the oral molar region further comprises a fixed plate, the fixed plate comprises a circular arc plate and two side plates, two ends of the circular arc plate are each connected to one of the two side plates, the circular arc plate is disposed on a top of the upper sleeve and a center of the circular arc plate has a recess, the recess is located immediately above the guiding hole; the side plates are connected to a top of the installation plates, the top of each of the installation plates is provided with one of the two side plates fixed thereon.

Furthermore, the lower sleeve and the upper sleeve are both hollow cylinders and coaxial with each other.

Furthermore, an inner diameter of the upper sleeve is equal to an inner diameter of the lower sleeve.

Furthermore, a cross section of the recess and a cross section of the guiding hole are both circular, and the recess and the guiding hole have a same radius and are coaxial with each other.

Furthermore, a diameter of the guiding hole is 2 mm-4 mm, and a width of the slit is 2-3 mm, trying to keep the diameter of the slit smaller than guiding hole is more advantageous for retaining the cavity preparation drilling tool in position.

Furthermore, the slit of the upper sleeve and the slit of the lower sleeve are placed on a same straight line, and the slit of the upper sleeve extends through the top and a bottom of the upper sleeve; the slit of the lower sleeve extends through the top and a bottom of the lower sleeve.

Another object of the present invention is to provide a cavity preparation assembly for immediate implantation in an oral molar region, which comprises a plurality of sleeves, the sleeves are any of the cavity preparation guiding sleeve for the immediate implantation in the oral molar region in the aforementioned technical solutions, any two sleeves are different in a size of the guiding hole. In the present technical solution, sleeves with a variety of inner diameters are provided, which match with different sizes of drilling tools, so that the guiding sleeves effectively avoid the deflection of the small-diameter implantation reamer in the larger tooth cavity, ensuring that the implant obtains a suitable three-dimensional position in the alveolar bone.

Furthermore, the aforementioned cavity preparation assembly for the immediate implantation in the oral molar region further comprises a depth calibration drilling tool guided by the sleeves, the depth calibration drilling tool comprises a drilling tool body and a drilling tool head disposed on the drilling tool body, a scale marking disposed on the drilling tool head, the scale marking is 7 mm-8 mm from an end of the drilling tool head, the end of the drilling tool head refers to an end of the drilling tool head away from the drilling tool body. In the present technical solution, the depth calibration drilling tool can conduct precise preparation according to the measured data, avoiding the blind preparation without a scale or repeated checks of preparation depth, and the diameter of the drilling tool is relative large, and the cutting efficiency is higher, shortening the preparation time; In one aspect the guiding sleeve can precisely guide the direction of the implantation cavity preparation drilling tool, its upper horizontal plane provides a stable reference for the drilling depth during the cavity preparation, improving the precision of the depth of the cavity prepared by the doctor, in another aspect the guiding sleeve can served as a rechecking tool, checking if the channel preparation reaches the predetermined diameter.

Preferably, the scale marking is a color block coated on the drilling tool head.

Compared with the prior art, the present invention has the following advantages and beneficial effects:

1. The present invention discloses the cavity preparation guiding sleeve for the immediate implantation in the oral molar region, wherein the slit is disposed on the sleeve, which is convenient for the doctor to observe the position of the drilling tool, performing the precise cavity preparation.

2. The present invention discloses the cavity preparation guiding sleeve for the immediate implantation in the oral molar region of the present invention, wherein the installation plates can be placed in the buccal/lingual side channel, avoiding the implantation cavity to deviate from the ideal position, which ensures stability.

3. The present invention discloses the cavity preparation guiding sleeve for the immediate implantation in the oral molar region of the present invention, wherein the clearance between the two installation plates as well as the slits of the upper sleeve and the lower sleeve can further serve as the cooling water channels, which can easily introduced water to the tip of the drilling tool, cooling the drilling tool.

4. The present invention discloses the cavity preparation guiding sleeve for the immediate implantation in the oral molar region of the present invention, which can precisely guide the direction of the implantation cavity preparation drilling tool, in one aspect the fixed plate providing a stable reference for the drilling depth during the cavity preparation, improving the precision of the depth of the cavity prepared by the doctor, in another aspect it can be placed on the natural tooth, which the latter is used as the guide plate for the implant surgery, providing the convenience for the immediate implant surgery to obtain an ideal implant position and for the initial stability of the implant, avoiding the doctor to be interfered by the irregular bone septum, thereby lowering the technical sensitivity of the immediate implant surgery in molar region.

5. The present invention discloses the cavity preparation assembly for the immediate implantation in the oral molar region, wherein the depth calibration drilling tool can conduct precise preparation according to the measured data, avoiding the blind preparation without a scale or repeated checks of preparation depth, and the diameter of the drilling tool is relative large, and the cutting efficiency is higher, shortening the preparation time; In one aspect the guiding sleeve can precisely guide the direction of the implantation cavity preparation drilling tool, its upper horizontal plane provides a stable reference for the drilling depth during the cavity preparation, improving the precision of the depth of the cavity prepared by the doctor, in another aspect the guiding sleeve can served as a rechecking tool, checking if the channel preparation reaches the predetermined diameter.

BRIEF DESCRIPTION OF THE DRAWINGS

The drawings described herein are intended to provide further understanding of the examples in the present invention, constitute a part of this application, and do not constitute a restriction of the examples in the present invention. In the drawings.

Annotation in the drawings and names of the corresponding parts are.

Figure 1:
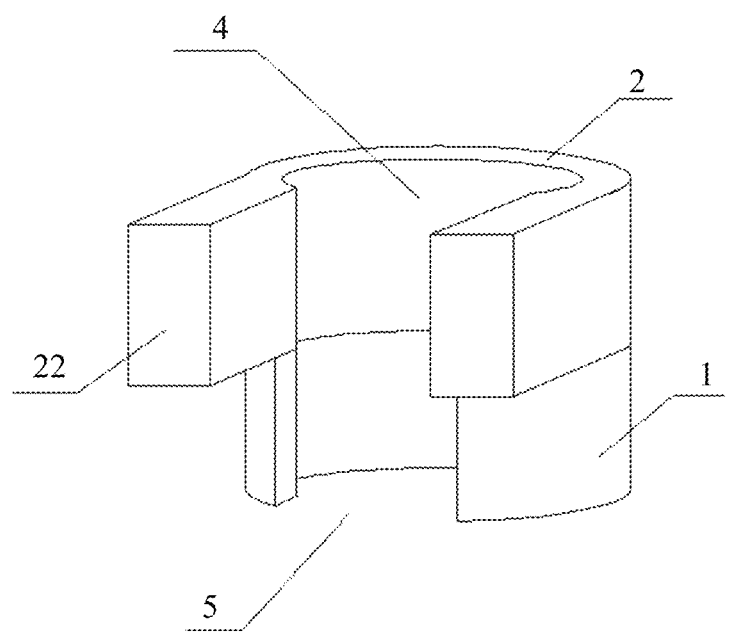
FIG. 1 is a schematic structural diagram of the cavity preparation guiding sleeve according to Example 1 of the present invention.

1—lower sleeve, 2—upper sleeve, 22—installation plates, 3—fixed plate, 31—circular arc plate, 32—side plates, 4—guiding hole, 5—slit, 6—depth calibration drilling tool, 61—drilling tool body, 62—drilling tool head, 63—scale marking.

DETAILED DESCRIPTION OF THE PREFERRED EMBODIMENTS

In order to make the objects, the technical solutions and the advantages of the present invention clearer, below with reference to examples and accompanying drawings, the present invention is further described in details, the illustrative embodiments of the present invention and the description thereof merely for purpose of illustration, and not intended to limit the present invention.

In the following description, numerous specific details are illustrated to provide a thorough understanding of the present invention. However, it will be apparent to one ordinarily skilled in the art that: the present invention may be practiced without these specific details. In other examples, to avoid obscuring the present invention, the well-known structures, circuits, materials or methods are not described in detail.

Throughout the specification, the reference to "one embodiment", "an embodiment", "one example" or "an example" means that: a particular feature, structure or characteristics described in connection with the embodiment or example is included in at least one embodiment of the present invention. Therefore, the phrases "in one embodiment", "in an embodiment", "one example" or "an example" throughout the specification are not all refer to a same embodiment or example. Besides, the particular feature, structure or characteristics can be combined in one or more embodiments or examples in any suitable combinations and, or sub-combinations. Furthermore, the person skilled in the art should appreciate that, the diagrams provided herein are for purpose of illustration, and the diagrams are not necessarily drawn to scale. The terms "and/or" as used herein comprises any and all combinations of one or more relatively listed items.

In the description of the present invention, it should be understood that, the orientation or positional relationship indicated by the phrases "front", "back", "left", "right", "up", "down", "vertical", "horizontal", "high", "low", "inside", "outside" and the like is based on the orientation or positional relationship shown in the drawings, merely for conveniently describing the present invention and simplifying the description, not intended to indicate or imply that the indicated device or component must have the specific orientation, or be constructed and operated in the specific orientation, therefore cannot be understood as limitations on the protective scope of the present invention.

Example 1

Figure 2:
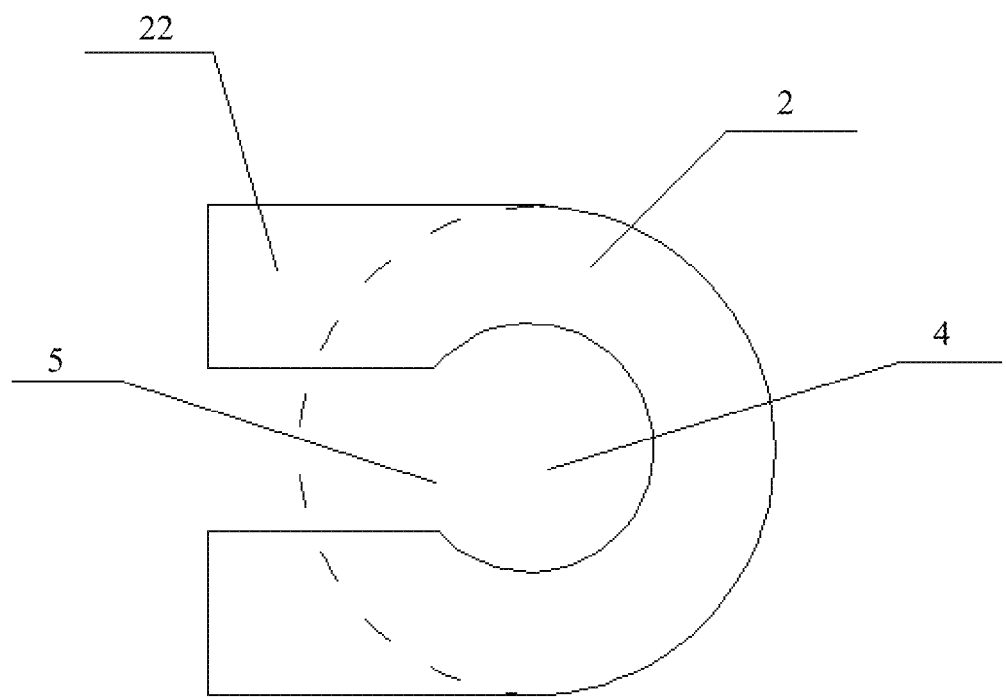
FIG. 2 is a top view of the cavity preparation guiding sleeve according to Example 1 of the present invention.
Figure 3:
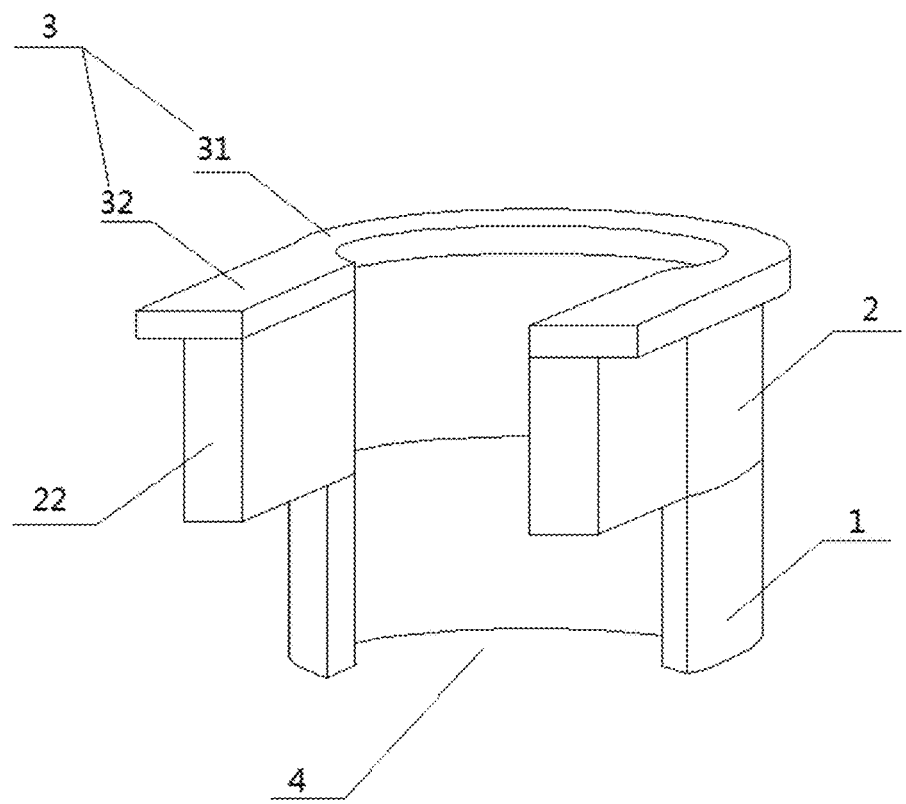
FIG. 3 is a schematic structural diagram of the cavity preparation guiding sleeve according to Example 2 of the present invention.

As shown in FIG. 1 and FIG. 2, a cavity preparation guiding sleeve for immediate implantation in an oral molar region of the present invention, comprising a lower sleeve 1 and an upper sleeve 2 disposed on a top of the lower sleeve 1, a bottom of the upper sleeve 2 fixed on the top of the lower sleeve 1, center portions of the upper sleeve 2 and the lower sleeve 1 each having a guiding hole 4 and the guiding holes of the upper sleeve 2 and the lower sleeve 1 connected with each other, an axis direction of the guiding hole 4 being a vertical direction, wherein an diameter of the guiding hole 4 is 2 mm-4 mm.

In the example, the lower sleeve 1 and the upper sleeve 2 are both hollow cylinders and coaxial with each other, an inner diameter of the upper sleeve 2 being equal to an inner diameter of the lower sleeve 1, an outer diameter of the upper sleeve 2 also being identical with an outer diameter of the lower sleeve 1, thereby the guiding holes of the upper sleeve 2 and the lower sleeve 1 having a circular cross section, a same radius and the guiding holes of the upper sleeve 2 and the lower sleeve 1 being coaxial with each other. Therefore inner walls of the upper sleeve 2 and the lower sleeve 1 are both in a same vertical arc surface, forming a smooth inner wall, which may not block the drilling tool during the drilling tool guiding process of cavity preparation.

Side walls of the upper sleeve 2 and the lower sleeve 1 are each provided with a slit 5 passing through the sidewalls, and the slit of the upper sleeve 2 and the slit 5 of the lower sleeve 1 are located on a same side of the cavity preparation guiding sleeve; in the example, the slits of the upper sleeve 2 and the lower sleeve 1 are both opened on front sidewalls thereof, and the slit of the upper sleeve 2 extends through the top and the bottom of the upper sleeve 2; and the slit of the lower sleeve 1 extends through the top and the bottom of the lower sleeve 1, and the slit 5 of the upper sleeve 2 and the slit 5 of the lower sleeve 1 are placed on a same straight line. Thus, the slit 5 of the upper sleeve 2 and the slit 5 of the lower sleeve 1 form, from top to bottom, a complete observation slit with a uniform width, so as to observe the position of the drilling tool during the cavity preparation, realizing the precise cavity preparation. The observation slit extends from the top of the upper sleeve 2 to the bottom of the lower sleeve 1, and through the inner and outer space of the cavity preparation guiding sleeve.

The upper sleeve 2 is further provided with an installation plate 22 on both sides of the slit 5, and the installation plate 22 is connected to the sidewalls on both sides of the slit of the upper sleeve 2. Thereby there is a clearance between the two installation plates, the clearance communicating with the slit 5. As shown in FIG. 2, since the upper sleeve 2 has a cylindrical structure, the connecting end faces of the installation plate 22 and the upper sleeve 2 are also arc surfaces. In the actual production, the installation plate 22, upper sleeve 2, lower sleeve 1 may be integrally formed.

In the cavity preparation process of the immediate implantation in the oral molar region, the preparation of channels is first performed: generally a height d of the tooth crown and a distance D from the center point of the occlusal surface of the tooth crown to 1 mm above the root bifurcation are measured firstly, the distance used as the depth of a central channel to be prepared; the preparation of the central channel is performed according to the measured depth D of the central channel, that is to say that a cylindrical central channel with a diameter of 6 mm and a depth of D is drilled at the corresponding position of the tooth; and then a buccal/lingual side channel of the tooth crown is prepared, the buccal/lingual side channel connected with the central channel, wherein a diameter is 6 mm, and a depth is d-1 mm. After the channels are prepared, the guiding sleeve in the present example is able to be placed in the central channel for cavity preparation guide, wherein, the lower sleeve 1 extends into the central channel, and the installation plate 22 can be placed in the buccal/lingual side channel, and since the installation plate 22 is defined in the buccal/lingual side channel, the guiding sleeve may not rotate, preventing the drilling tool from sliding, thereby avoiding the implantation cavity to deviate from the ideal position, which ensures stability. In addition, the installation plate 22 also has following advantages: the clearance between the two installation plates as well as the slits of the upper sleeve 2 and the lower sleeve can further serve as the cooling water channels. During the cavity preparation process with a high speed rotation of drilling tool, wherein the rotational speed is faster, and the temperature is higher, easily causing the osteonecrosis. After discovering this problem, inventor(s) of the present invention designed the clearance between the installation plate and the slits, which not only facilitates the observation of the position of the drilling tool, prevents the drilling tool from sliding, but more importantly provides the cooling water channels, by which, water can be easily introduced to the tip of the drilling tool, cooling the drilling tool, achieving three things at one stroke.

Example 2

As shown in FIGS. 3-5 and 9, the present example further performs following improvements on the basis of Example 1: the cavity preparation guiding sleeve for the immediate implantation in the oral molar region further comprises a fixed plate 3, the fixed plate 3 comprising one circular arc plate 31 placed horizontally and two side plates placed horizontally, two ends of the circular arc plate 31 each connected to one of the two side plates 32, the circular arc plate 31 disposed on the top of the upper sleeve 2 and a center of the circular arc plate having a recess 33, wherein the recess 33 is located immediately above the guiding hole 4, thus on the horizontal plane the circular arc plate 31 is actually a circular flat plate missing an arc section; and the side plates 32 are connected to a top of the installation plates, and the top of each of the installation plates is provided with one of the two side plates fixed thereon.

Figure 4:
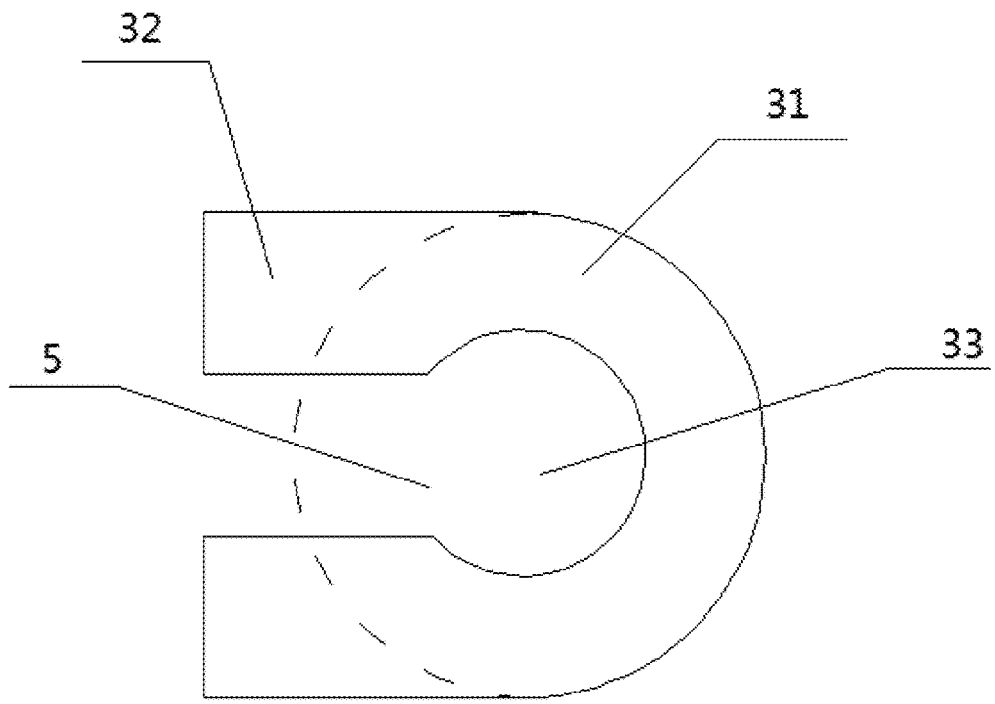
FIG. 4 is a top view of the cavity preparation guiding sleeve according to Example 2 of the present invention.

As shown in FIG. 4, the two ends of the circular arc plate 31 are arc surfaces, so that the connecting end faces of the side plates 32 and the circular arc plate 31 are also arc surfaces. In the actual production, the circular arc plate 31 and the side plates 32 may also be formed integrally.

Cross sections of the recess 33 and the guiding hole 4 are both circular, and the recess 33 and the guiding hole 4 have a same radius and are coaxial with each other, so that inner walls of the fixed plate 3, the upper sleeve 2 and the lower sleeve 1 are all in a same vertical arc surface, forming a smooth inner wall, which may not block the drilling tool during the drilling tool guiding process of cavity preparation.

In the example, another clearance is formed between the side plates 32 on both sides, to prevent the drilling tool from being blocked and the water from being blocked.

An outer diameter of the circular arc plate 31 is larger than an outer diameter of the upper sleeve 2.

In the example, the guiding sleeve can precisely guide the direction of the implantation cavity preparation drilling tool, in one aspect the fixed plate 3 providing a stable reference for the drilling depth during the cavity preparation, improving the precision of the depth of the cavity prepared by the doctor, in another aspect it can be placed on the natural tooth, which the latter is used as the guide plate for the implant surgery, providing the convenience for the immediate implant surgery to obtain an ideal implant position and for the initial stability of the implant, avoiding the doctor to be interfered by the irregular bone septum, thereby lowering the technical sensitivity of the immediate implant surgery in molar region.

Example 3

Figure 7:
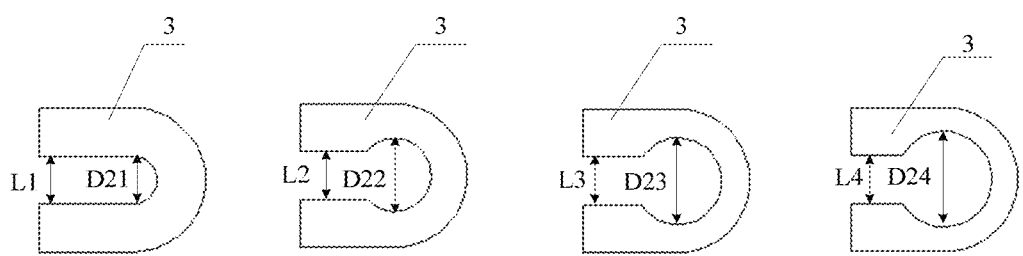
FIG. 7 is a schematic structural diagram of the four cavity preparation guiding sleeves according to Example 3 of the present invention.

The present example provides a cavity preparation assembly for immediate implantation in an oral molar region, the said assembly comprising 4 sleeves and a depth calibration drilling tool 6 guided by the sleeves, wherein the sleeves are the cavity preparation guiding sleeve for the immediate implantation in the oral molar region in Example 2, however, all of the sleeves are different in a size of the guiding hole 4, as shown in FIG. 7.

Figure 8:
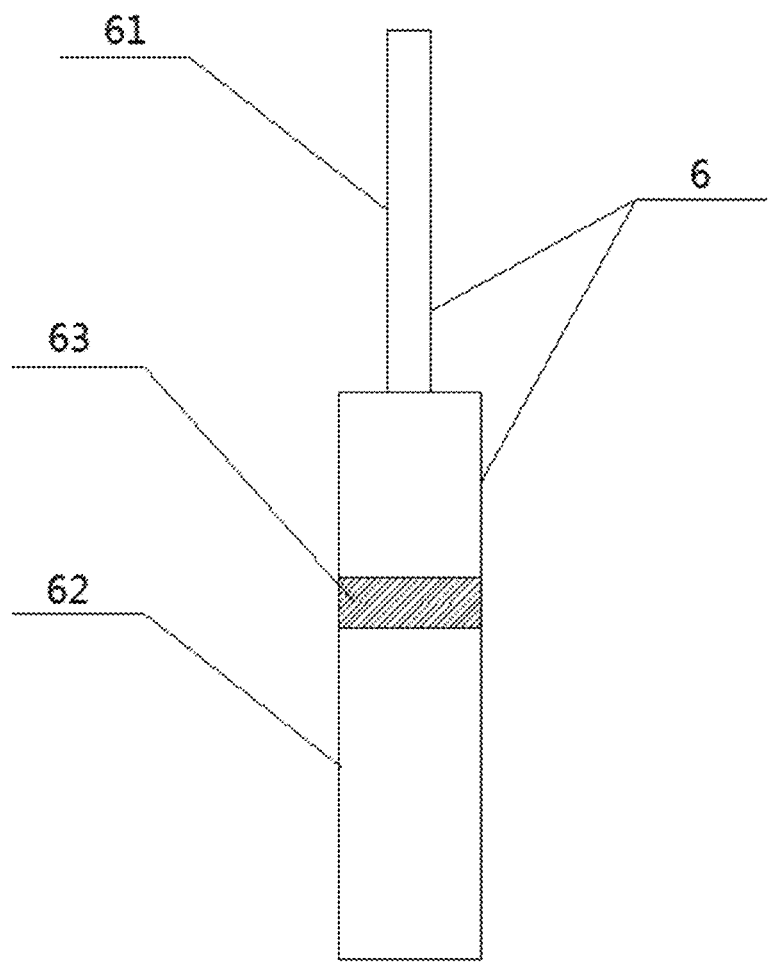
FIG. 8 is a schematic structural diagram of the depth calibration drilling tool according to Example 3 of the present invention.

As shown in FIG. 8, the depth calibration drilling tool 6 comprises drilling tool handle, a drilling tool body 61 and a drilling tool head 62 disposed on the drilling tool body 61, wherein the drilling tool body 61 is connected between the drilling tool handle and the drilling tool head 62, and the drilling tool handle can be matched with a dental turbine; and a scale marking 63 is disposed on the drilling tool head 62, wherein the scale marking 63 is 7 mm-8 mm from an end of the drilling tool head 62, and the end of the drilling tool head 62 refers to an end of the drilling tool head 62 away from the drilling tool body 61, and the scale marking 63 is a color block coated on the drilling tool head 62.

In the example, the depth calibration drilling tool 6 is used to perform precise preparation of the central channel and the buccal/lingual side channel according to its own scale, the drilling tool used to prepare the cavity of the implant can then perform the precise cavity preparation according to the desired preparation depth of the tooth obtained by the measurement, and the implant surgery can be guided by the guiding sleeve placed on the prepared cavity, thereby using the natural tooth as the guide plate for the implant surgery, providing the convenience for the immediate implant surgery to obtain an ideal implant position and for the initial stability of the implant, avoiding the doctor to be interfered by the irregular bone septum, thereby lowering the technical sensitivity of the immediate implant surgery in molar region; and the said depth calibration drilling tool 6 is a cost effective, and able to be matched with the turbine used conventionally in the oral cavity, the relative large diameter and long length of the working edge being convenient to use, and simple to operate, and the guiding sleeves effectively avoiding the deflection of the small-diameter implantation reamer in the larger tooth cavity, ensuring that the implant obtains a suitable three-dimensional position in the alveolar bone.

Example 4

Based on Example 3, the present example provides a preferred size for the cavity preparation assembly.

The drilling tool head 62 of the depth calibration drilling tool 6 in the present example is a ten-edge tungsten steel drilling tool head having a diameter of 2.3 mm and a length of 11 mm; the depth calibration drilling tool 6 is provided a scale on a sidewall of the drilling tool body 61 close to the drilling tool head 62, wherein the graduation value of the scale is 1.0 mm; and a black area on the drilling tool head 62 which is marked at a distance of 7-8 mm (an ideal depth) from the tip of the drilling tool head 26 is the color block. Furthermore, the scale of the depth calibration drilling tool 6 disposed on a sidewall of the drilling tool body 61 close to the drilling tool head 62 is formed by different color areas. With such design, the doctor is able to read the value directly, according to the color of the position that the drilling tool plunges into the tooth, to determine if the predetermined depth has been reached.

In the example, because an average length of the molar crown and the root bifurcation is about 10-11 mm, the graduation value is 1 mm, and the length of the working edge of the drilling tool is set to 11 mm. Since the length of the molar crown is about 7-8 mm on average, the color block is set at 7-8 mm.

As shown in FIG. 7, the diameters of the guiding holes of the 4 guiding sleeves are sub subsequently and respectively D21=2 mm, D22=3 mm, D23=3.5 mm and D24=4 mm. The diameter sizes are also the inner diameter sizes of the upper sleeve 2, lower sleeve 1 and circular arc plate 31. Moreover, the widths of the slits of the 4 guiding sleeves are in sequence L1=2 mm, L2=2 mm, L3=3 mm and L4=3 mm, trying to keep the diameters of the slits smaller than the guiding holes is more advantageous for retaining the cavity preparation drilling tool in position. The other sizes of the 4 guiding sleeves are the same.

One guiding sleeve of the guiding sleeves of which the diameter of the guiding hole 4 is D22=3 mm, and the width of the slit is L2=2 mm is taken as an example, to illustrate the rest of the sizes of the guiding sleeve.

Figure 5:
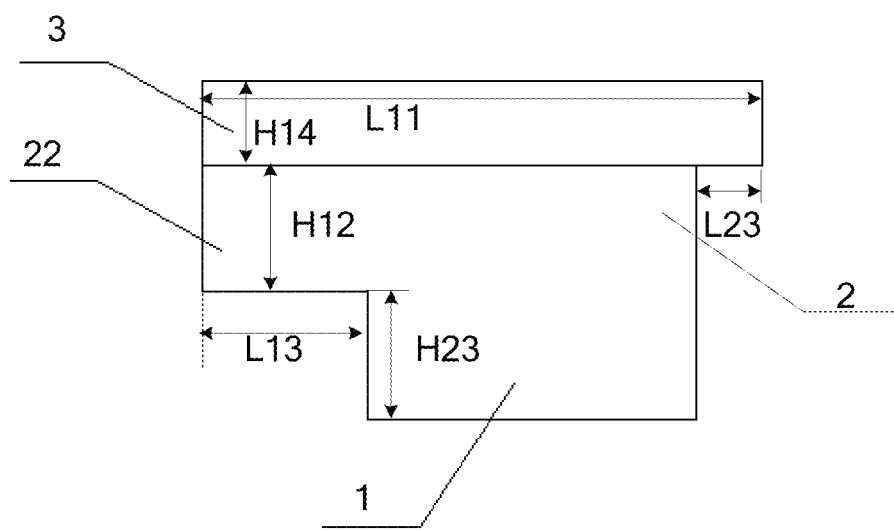
FIG. 5 is a right view of the cavity preparation guiding sleeve according to Example 2 of the present invention.
Figure 6:
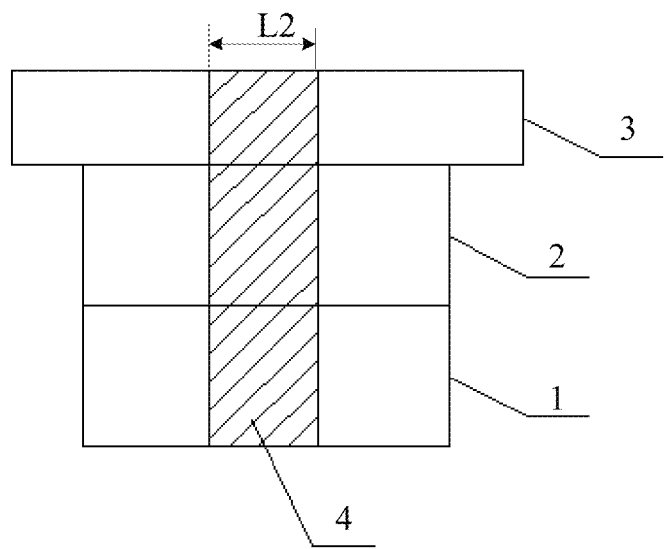
FIG. 6 is a front view of the cavity preparation guiding sleeve according to Example 3 of the present invention.
Figure 9:
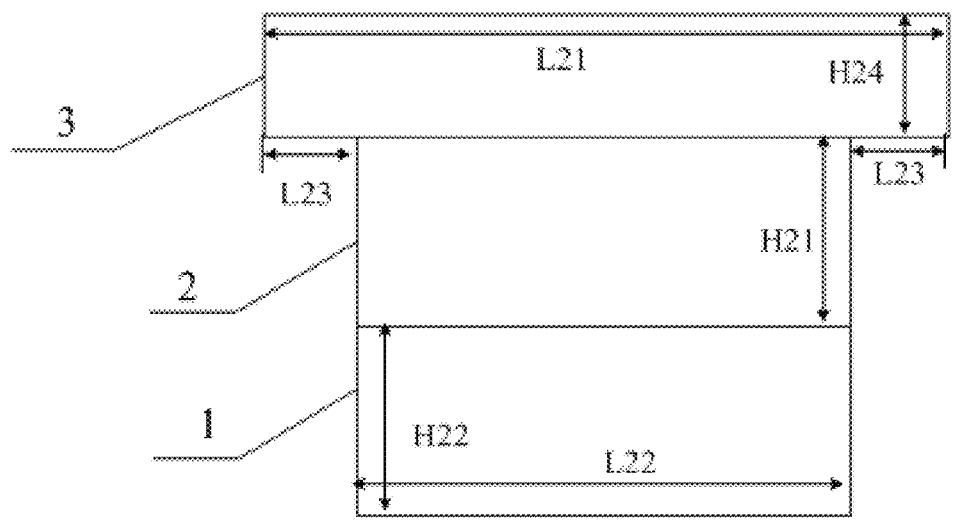
FIG. 9 is a back view of the cavity preparation guiding sleeve according to Example 3 of the present invention.

As shown in FIG. 5, FIG. 6 and FIG. 9, the outer diameter L22 of the lower sleeve 1 is 5 mm, the height H22 is 2 mm, and the width L2 of the slit 5 is 2 mm;

the outer diameter of the upper sleeve 2 is 5 mm, the height H21 is 2 mm, and the width L2 of the slit 5 is 2 mm; and the distance L13 between one end of the installation plate 22 away from the upper sleeve 2 and the upper sleeve 2 is 2 mm, the height H12 is 2 mm, and the width of the clearance between the two installation plates is 2 mm.

An outer diameter L21 of the circular arc plate 31 of the fixed plate 3 is 6 mm, and the thickness H24 is 1 mm; and the radius difference L23 between the circular arc plate 31 and the upper sleeve 2 is 0.5 mm.

The thickness H14 of each of the side plates 32 is 1 mm, and the length L11 of the fixed plate 3 is 7.5 mm.

The method of using the guiding assembly in the present example is that: measuring a height d of the tooth crown and a distance D from the center point of the occlusal surface of the tooth crown to 1 mm above the root bifurcation; mounting the drilling tool handle of the depth calibration drilling tool 6 on a dental turbine; preparing the central channel according to the measured depth D of the central channel, namely using the depth calibration drilling tool 6 to drill a cylindrical central channel with a diameter of 6 mm and a depth of D at the corresponding position of the tooth; using depth calibration drilling tool 6 to prepare the a buccal/lingual side channel of the tooth crown, the buccal/lingual side channel connected with the central channel, wherein a diameter is 6 mm, and a depth is d−1 mm; and subsequently placing the guiding sleeves in the prepared central channel in ascending order of the diameter of the guiding hole 4 thereof, after one guiding sleeve placed, carrying out the implant cavity preparation under the guide of the placed guiding sleeve, thereafter a next guiding sleeve placed for further cavity preparation.

In the example, the depth calibration drilling tool 6 can conduct precise preparation according to the measured data, avoiding the blind preparation without a scale or repeated checks of preparation depth, and the diameter of the drilling tool is relative large, and the cutting efficiency is higher, shortening the preparation time; In one aspect the guiding sleeve can precisely guide the direction of the implantation cavity preparation drilling tool, its upper horizontal plane provides a stable reference for the drilling depth during the cavity preparation, improving the precision of the depth of the cavity prepared by the doctor, in another aspect the guiding sleeve can served as a rechecking tool, checking if the channel preparation reaches the predetermined diameter.

The embodiments described above, further illustrate the purposes, technical solutions and beneficial effects of the present invention. It is to be understood that the foregoing is only the embodiments of the present invention, and is not intended to limit the protective scope of the present invention. Any modifications, equivalent substitutes, improvements and the like made within the spirit and principle of the present invention should all be included in the scope of the present invention.

What is claimed is:

1. A cavity preparation guiding sleeve for immediate implantation in an oral molar region, comprising;
    a lower sleeve and an upper sleeve disposed on a top thereof, a center portion of the upper sleeve and a center portion of the lower sleeve each having a guiding hole, wherein the guiding hole of the upper sleeve and the guiding hole of the lower sleeve are connected, and an axis direction of the guiding hole being a vertical direction;
    a sidewall of the upper sleeve and a side wall of the lower sleeve each having a slit therethrough, wherein the slit of the upper sleeve and the slit of the lower sleeve are located on a same side of the cavity preparation guiding sleeve;
    two installation plates respectively disposed on both sides of the slit of the upper sleeve, wherein the installation plates are respectively connected to the sidewalls on both sides of the slit of the upper sleeve; and
    a fixed plate, the fixed plate comprising a circular arc plate and two side plates, two ends of the circular arc plate are each connected to one of the two side plates, the circular arc plate is disposed on a top of the upper sleeve and an end of each of the two side plates farthest from the circular arc plate is aligned with an end of a corresponding installation plate of the two installation plates, the outer diameter of the circular arc plate being larger than an outer diameter of the upper sleeve.

2. The cavity preparation guiding sleeve of claim 1, wherein a center of the circular arc plate having a recess, wherein the recess is located immediately above the guiding hole; and the two side plates are connected to a top of the two installation plates, wherein the top of each of the installation plates is provided with one of the two side plates fixed thereon.

3. The cavity preparation guiding sleeve of claim 1, wherein the lower sleeve and the upper sleeve are both hollow cylinders and coaxial with each other.

4. The cavity preparation guiding sleeve of claim 3, wherein an inner diameter of the upper sleeve is equal to an inner diameter of the lower sleeve.

5. The cavity preparation guiding sleeve of claim 3, wherein a cross section of the recess and a cross section of the guiding hole are both circular, and the recess and the guiding hole have a same radius.

6. The cavity preparation guiding sleeve of claim 5, wherein a diameter of the guiding hole is 2-4 mm, and a width of the slit is 2-3 mm.

7. The cavity preparation guiding sleeve of claim 1, wherein the slit of the upper sleeve and the slit of the lower sleeve have a same width and are aligned on a same straight line, wherein the slit of the upper sleeve extends through the top and a bottom of the upper sleeve; and the slit of the lower sleeve extends through the top and a bottom of the lower sleeve.

8. A cavity preparation assembly for immediate implantation in an oral molar region, comprising a plurality of sleeves, each of the plurality of sleeves being the cavity preparation guiding sleeve claimed in claim 1, wherein any two sleeves of the plurality of sleeves are different in a size of the guiding hole.

9. The cavity preparation assembly of claim 8, further comprising a depth calibration drilling tool guided by the plurality of sleeves, the depth calibration drilling tool comprising a drilling tool body and a drilling tool head disposed thereon, a scale marking disposed on the drilling tool head, wherein the scale marking is 7-8 mm from an end of the drilling tool head, and the end of the drilling tool head refers to an end of the drilling tool head away from the drilling tool body.

10. The cavity preparation assembly of claim 9, wherein the scale marking is a color block coated on the drilling tool head.

11. The cavity preparation guiding sleeve of claim 2, wherein the lower sleeve and the upper sleeve are both hollow cylinders and coaxial with each other.

12. The cavity preparation guiding sleeve of claim 11, wherein an inner diameter of the upper sleeve is equal to an inner diameter of the lower sleeve.

13. The cavity preparation guiding sleeve of claim 11, wherein a cross section of the recess and a cross section of the guiding hole are both circular, and the recess and the guiding hole have a same radius and are coaxial with each other.

14. The cavity preparation guiding sleeve of claim 13, wherein a diameter of the guiding hole is 2-4 mm, and a width of the slit is 2-3 mm.

15. The cavity preparation guiding sleeve of claim 2, the slit of the upper sleeve and the slit of the lower sleeve have a same width and are aligned on a same straight line, wherein the slit of the upper sleeve extends through the top and a bottom of the upper sleeve, and the slit of the lower sleeve extends through the top and a bottom of the lower sleeve.

16. A cavity preparation assembly for immediate implantation in an oral molar region, comprising a plurality of sleeves, each of the plurality of sleeves being the cavity preparation guiding sleeve claimed in claim 2, wherein any two sleeves of the plurality of sleeves are different in a size of the guiding hole.

17. The cavity preparation assembly of claim 16, further comprising a depth calibration drilling tool guided by the plurality of sleeves, the depth calibration drilling tool comprising a drilling tool body and a drilling tool head disposed thereon, a scale marking disposed on the drilling tool head, wherein the scale marking is 7-8 mm from an end of the drilling tool head, and the end of the drilling tool head refers to an end of the drilling tool head away from the drilling tool body.

18. The cavity preparation assembly of claim 17, wherein the scale marking is a color block coated on the drilling tool head.

19. The cavity preparation guiding sleeve of claim 18, wherein the lower sleeve and the upper sleeve are both hollow cylinders and coaxial with each other.

20. The cavity preparation guiding sleeve of claim 19, wherein a cross section of the recess and a cross section of the guiding hole are both circular, and the recess and the guiding hole have a same radius and are coaxial with each other.

* * * * *

UNITED STATES PATENT AND TRADEMARK OFFICE
CERTIFICATE OF CORRECTION

PATENT NO. : 11,090,140 B2
APPLICATION NO. : 16/328027
DATED : August 17, 2021
INVENTOR(S) : Haiyang Yu, Xi Chen and Yuwei Zhao It is certified that error appears in the above-identified patent and that said Letters Patent is hereby corrected as shown below:

On the Title Page

Column 2, item (57), Please replace the Abstract with the following:
A cavity preparation assembly and a guiding sleeve for immediate implantation in an oral molar region, wherein the guiding sleeve comprises a lower sleeve and an upper sleeve disposed on a top thereof, center portions of the upper sleeve and the lower sleeve each has a guiding hole and the guiding holes are connected; sidewalls of the upper sleeve and the lower sleeve are each provided with a slit therethrough; the upper sleeve has an installation plate on both sides of the slit, the installation plate is connected to the sidewalls. The cavity preparation assembly comprises a depth calibration needle and a plurality of guiding sleeves. The present invention not only facilitates observation of the position of the needle, prevent the needle from sliding, but also provides the cooling water channels to cool the needle, avoiding osteonecrosis. The depth calibration needle
performs precise cavity preparation according to the preparation depth.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*